United States Patent
Chen

(10) Patent No.: US 11,884,189 B2
(45) Date of Patent: Jan. 30, 2024

(54) CHILD SAFETY SEAT

(71) Applicant: BAMBINO PREZIOSO SWITZERLAND AG, Steinhausen (CH)

(72) Inventor: Yingzhong Chen, Guangdong (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/786,954

(22) PCT Filed: Dec. 17, 2020

(86) PCT No.: PCT/EP2020/086654
§ 371 (c)(1),
(2) Date: Jun. 17, 2022

(87) PCT Pub. No.: WO2021/122901
PCT Pub. Date: Jun. 24, 2021

(65) Prior Publication Data
US 2023/0034226 A1 Feb. 2, 2023

(30) Foreign Application Priority Data

Dec. 18, 2019 (CN) .......................... 201911312347.9

(51) Int. Cl.
*B60N 2/28* (2006.01)
(52) U.S. Cl.
CPC ......... *B60N 2/2887* (2013.01); *B60N 2/2821* (2013.01)
(58) Field of Classification Search
CPC ............................ B60N 2/2887; B60N 2/2821
See application file for complete search history.

(56) References Cited

U.S. PATENT DOCUMENTS

| | | | | |
|---|---|---|---|---|
| 9,849,812 B2* | 12/2017 | Cheng | .................. | B60N 2/2824 |
| 10,640,020 B2* | 5/2020 | Jung | .................... | B60N 2/2875 |

(Continued)

FOREIGN PATENT DOCUMENTS

| | | |
|---|---|---|
| CN | 203698009 U | 7/2014 |
| CN | 204956183 U | 1/2016 |

(Continued)

OTHER PUBLICATIONS

International Search Report and Written Opinion issued in corresponding International Application No. PCT/EP2020/086654, dated Mar. 12, 2021, pp. 1-12, European Patent Office, Rijswijk, Netherlands.

*Primary Examiner* — Philip F Gabler
(74) *Attorney, Agent, or Firm* — HAUPTMAN HAM, LLP

(57) ABSTRACT

A child safety seat includes an ISOFIX assembly and a base. The ISOFIX assembly includes a support foot, a connecting portion, and a sliding rail portion between the support foot and the connecting portion. The connecting portion connects to a car seat. The sliding rail portion includes a first sliding rail portion and a second sliding rail portion connected to the first sliding rail portion. A width of the second sliding rail portion is larger than a width of the first sliding rail portion. The base has a frame assembly which has a sleeve portion slidably sleeved on the sliding rail portion. The sleeve portion includes first and second sleeve portions slidably sleeved on corresponding first and second sliding rail portions. The base is operable to be adjusted telescopically with respect to the ISOFIX assembly through a sliding cooperation between the sliding rail portion and the sleeve portion.

16 Claims, 11 Drawing Sheets

(56) References Cited

U.S. PATENT DOCUMENTS

| | | | | |
|---|---|---|---|---|
| 11,701,985 B1* | 7/2023 | Cabral | ................ | B60N 2/0825 |
| | | | | 296/65.11 |
| 2007/0069562 A1 | 3/2007 | Van Montfort et al. | | |
| 2008/0303321 A1* | 12/2008 | Powell | ................ | B60N 2/2845 |
| | | | | 297/216.11 |
| 2008/0315647 A1* | 12/2008 | Carine | ................ | B60N 2/2863 |
| | | | | 297/250.1 |
| 2016/0200225 A1* | 7/2016 | Van Der Veer | ...... | B60N 2/2863 |
| | | | | 297/256.16 |
| 2022/0097577 A1* | 3/2022 | Thenander | ........... | B60N 2/2875 |
| 2023/0024000 A1* | 1/2023 | Mo | ..................... | B60N 2/2887 |

FOREIGN PATENT DOCUMENTS

| | | | |
|---|---|---|---|
| CN | 110562103 | A | 12/2019 |
| EP | 1 477 356 | A1 | 11/2004 |
| EP | 1 714 826 | A1 | 10/2006 |
| EP | 3190001 | A1 | 7/2017 |
| FR | 3 002 886 | A1 | 9/2014 |
| FR | 3006952 | A3 | 12/2014 |
| TW | I472448 | B | 2/2015 |

* cited by examiner

CHILD SAFETY SEAT

The present application is a U.S. National Phase of International Application Number PCT/EP2020/086654, filed Dec. 17, 2020, which claims priority to Chinese Application No. 201911312347.9, filed Dec. 18, 2019, the entirety of each of which are incorporated herein by reference.

FIELD

One or more embodiments of the present invention relate to a seat, particularly a child safety seat.

BACKGROUND

In order to ensure the safety of a child when riding in a car, more and more parents install a child safety seat on a seat in the car. In the prior art, the child safety seat is fixed on the car seat by an existing safety belt. However, the aforesaid fixing manner is not reliable. An impact force during a car accident may throw the child safety seat out. Therefore, a fixing device with ISOFIX standard has been developed. All of the child safety seats can be safely fixed on the car seat by the fixing device with ISOFIX standard.

In general, the child safety seat having the fixing device with ISOFIX standard mainly includes a seat body, a base and an ISOFIX assembly. The ISOFIX assembly can be connected to an ISOFIX port on the car seat. The ISOFIX assembly is usually disposed on the base and fixed by screws, such that the child safety seat is situated at a fixed position with respect to the ISOFIX assembly. That is to say, the position of the child safety seat with respect to the car sat is fixed and it is difficult to take care of the needs of children with different ages. Furthermore, the joint between the ISOFIX assembly and the base may become loose, resulting in shaking between the base and the ISOFIX assembly, such that the child seated in the child safety seat may be uncomfortable or unsafe.

Therefore, it is necessary to provide a child safety seat to solve the aforesaid defects in one or more embodiments.

SUMMARY

One or more embodiments of the present invention aims at providing a child safety seat, wherein an ISOFIX assembly and a base can achieve stable connection, reduce shaking between the ISOFIX assembly and the base, ensure the stability and safety of the child, and allow the ISOFIX assembly to be adjusted telescopically with respect to the base. Accordingly, the child safety seat of one or more embodiments of the invention can be adjusted to a comfortable position required by a child seated therein and satisfies the riding requirements of children with different ages.

This is achieved by a child safety seat according to claim 1. The dependent claims pertain to corresponding further developments and improvements.

As will be seen more clearly from the detailed description following below, the claimed child safety seat includes an ISOFIX assembly and a base. The ISOFIX assembly includes a support foot, a connecting portion, and a sliding rail portion disposed between the support foot and the connecting portion. The connecting portion is configured to connect a car seat. The sliding rail portion includes a first sliding rail portion and a second sliding rail portion connected to the first sliding rail portion. A width of the second sliding rail portion is larger than a width of the first sliding rail portion. The base has a frame assembly. The frame assembly has a sleeve portion slidably sleeved on the sliding rail portion. The sleeve portion includes a first sleeve portion slidably sleeved on the first sliding rail portion and a second sleeve portion slidably sleeved on the second sliding rail portion. The base is operable to be adjusted telescopically with respect to the ISOFIX assembly through a sliding cooperation between the sliding rail portion and the sleeve portion.

Compared to the prior art, the ISOFIX assembly of the child safety seat of at least one embodiment of the invention includes the first sliding rail portion and the second sliding rail portion, and the width of the second sliding rail portion is larger than the width of the first sliding rail portion, such that the sliding rail portion provides three point support for the frame assembly. When the first sliding rail portion is slidably inserted into the first sleeve portion and the second sliding rail portion is slidably inserted into the second sleeve portion, the ISOFIX assembly provides three point support for the frame assembly, so as to enhance the stability between the ISOFIX assembly and the frame assembly and reduce shaking of the ISOFIX assembly on the frame assembly. More particularly, when the base is operated to slide on the ISOFIX assembly, the ISOFIX assembly can be adjusted telescopically with respect to the base, the stability of sliding can be ensured, the shaking between the ISOFIX assembly and the base can be reduced, and the comfort and safety of a child seated in the child safety seat can be improved simultaneously. Furthermore, since the ISOFIX assembly can be adjusted telescopically with respect to the base, the child safety seat can be adjusted to a comfortable position required by a child seated therein and satisfies the riding requirements of children with different ages.

In at least one embodiment, the base further has an operating mechanism and the operating mechanism is operable to control the sliding cooperation between the sliding rail portion and the sleeve portion.

In at least one embodiment, the operating mechanism is disposed on the frame assembly, the operating mechanism includes an engaging device, and the engaging device includes an engaging hook for engaging with the ISOFIX assembly.

In at least one embodiment, the operating mechanism further includes an operating member connected to the engaging device and the operating member is operable to drive the engaging hook to unlock the ISOFIX assembly.

In at least one embodiment, the first sliding rail portion has at least one engaging hole engaged with the engaging hook.

In at least one embodiment, the engaging device further includes a fixing bracket and the engaging hook is connected to the operating member through the fixing bracket.

In at least one embodiment, the operating member has a driving groove, the fixing bracket has a fixing pillar extending into the driving groove, and the operating member is operable to enable the driving groove to drive the fixing pillar to move, such that the engaging hook unlocks the ISOFIX assembly.

In at least one embodiment, the engaging device further includes an elastic member and the elastic member drives the operating member to return, such that the engaging hook engages with the ISOFIX assembly.

In at least one embodiment, the operating member has a button and the button is operable to enable the operating member to drive the engaging hook to unlock the ISOFIX assembly.

In at least one embodiment, the sliding rail portion of the ISOFIX assembly is Y-shaped.

In at least one embodiment, the first sliding rail portion is a straight tube, the second sliding rail portion is a U-shaped tube, an opening end of the U-shaped tube is connected to the connecting portion, and a side of the U-shaped tube opposite to the opening end is connected to the straight tube.

In at least one embodiment, the U-shaped tube is connected to the straight tube.

In at least one embodiment, a decorative cover member is disposed within the U-shaped tube and the decorative cover member is connected to the U-shaped tube.

In at least one embodiment, the connecting portion has two connecting rods and the two connecting rods are configured to connect an anchor port on a car seat.

In at least one embodiment, the base has a through hole and the button passes through the through hole.

In at least one embodiment, a sliding sleeve is disposed between the second sliding rail portion and the second sleeve portion.

Through the following description along with the accompanying drawings, the one or more embodiments of the invention will become clearer. These drawings are used to explain the embodiments of the invention.

BRIEF DESCRIPTION OF THE DRAWINGS

In the following, one or more embodiments of the invention are further illustrated by way of example, taking reference to the accompanying drawings thereof.

DETAILED DESCRIPTION

Figure 1:
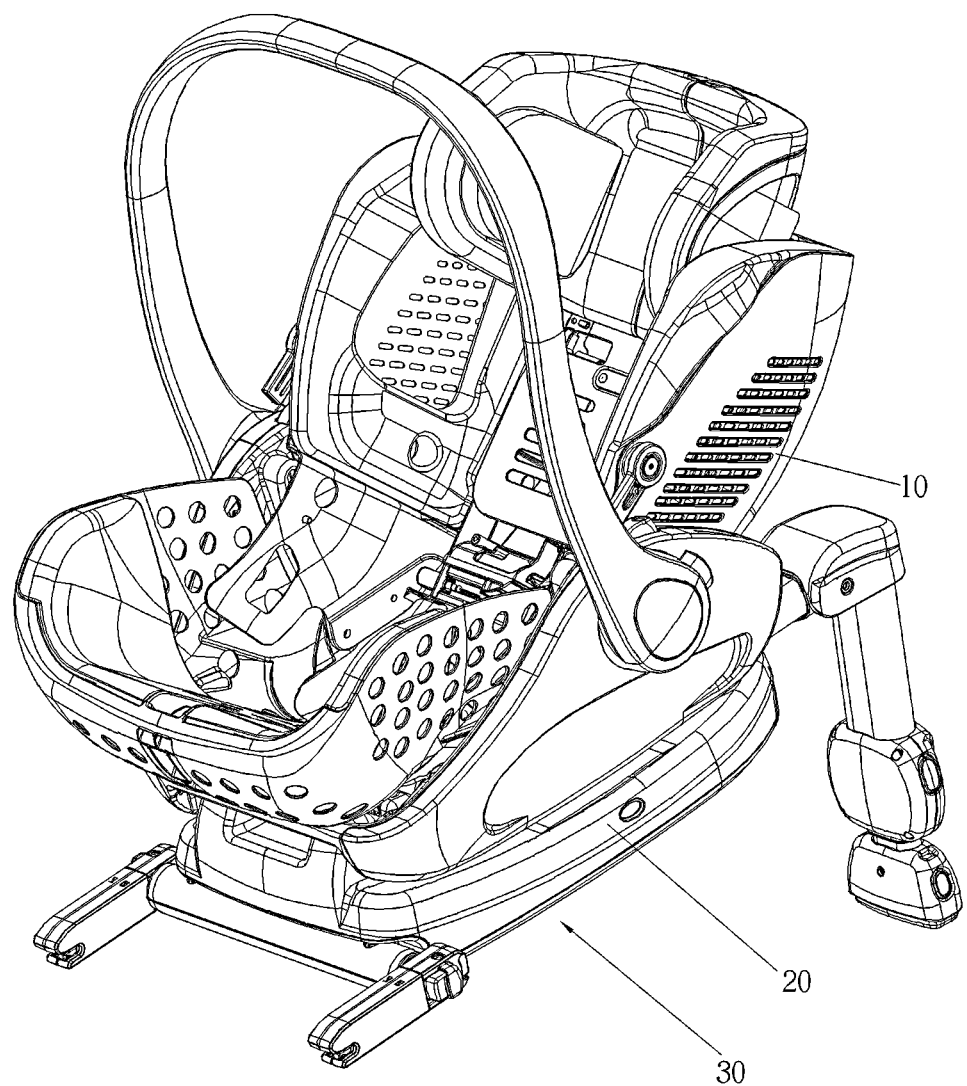
FIG. 1 is a perspective view illustrating a child safety seat of an embodiment of the invention.

The embodiments of the invention will now be described with reference to the accompanying drawings, wherein similar numbers represent similar elements.

As shown in FIGS. 1 to 4, a child safety seat 100 includes a seat body 10, a base 20 and an ISOFIX assembly 30. The base 20 has a frame assembly 40. The seat body 10 is disposed on the base 20. The ISOFIX assembly 30 is connected to the base 20 by the frame assembly 40. Specifically, the ISOFIX assembly 30 includes a support foot 31, a connecting portion 33, and a sliding rail portion 35 disposed between the support foot 31 and the connecting portion 33. The support foot 31 may abut against a bottom surface in a car, so as to support the child safety seat 100 stably. The connecting portion 33 is configured to connect a car seat. The sliding rail portion 35 includes a first sliding rail portion 351 and a second sliding rail portion 353 connected to the first sliding rail portion 351. A width of the second sliding rail portion 353 is larger than a width of the first sliding rail portion 351. The frame assembly 40 has a sleeve portion 40a slidably sleeved on the sliding rail portion 35. The sleeve portion 40a includes a first sleeve portion 41 slidably sleeved on the first sliding rail portion 351 and a second sleeve portion 43 slidably sleeved on the second sliding rail portion 353, wherein the base 20 is operable to slide on the ISOFIX assembly 30 through a sliding cooperation between the sliding rail portion 35 and the sleeve portion 40a, such that the ISOFIX assembly 30 can be adjusted telescopically with respect to the base 20.

Figure 4:
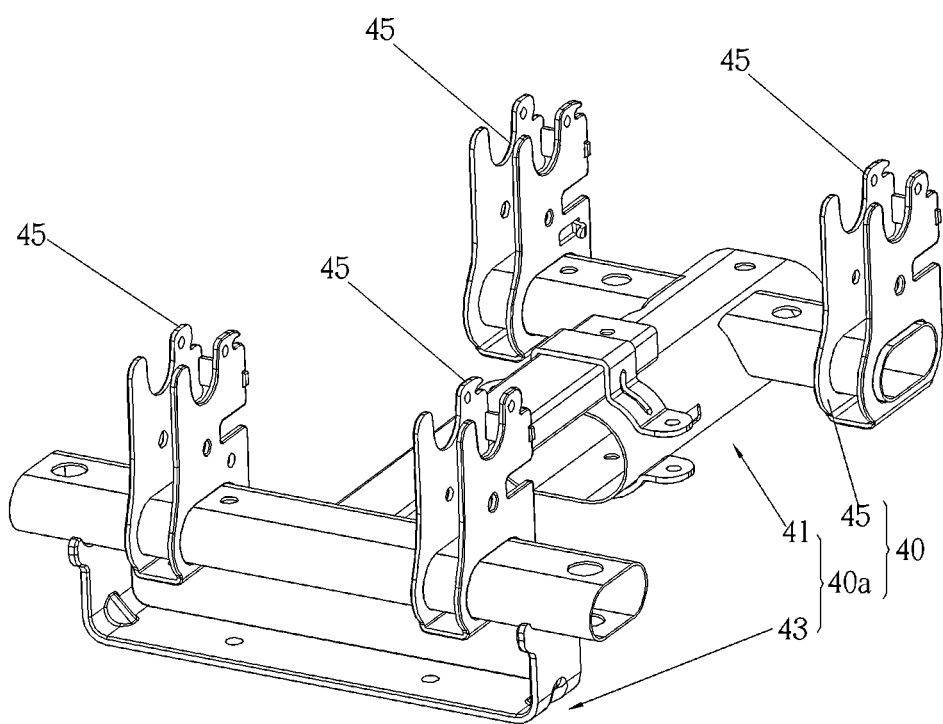
FIG. 4 is a schematic view illustrating parts of a frame assembly of an embodiment of the invention.
Figure 5:
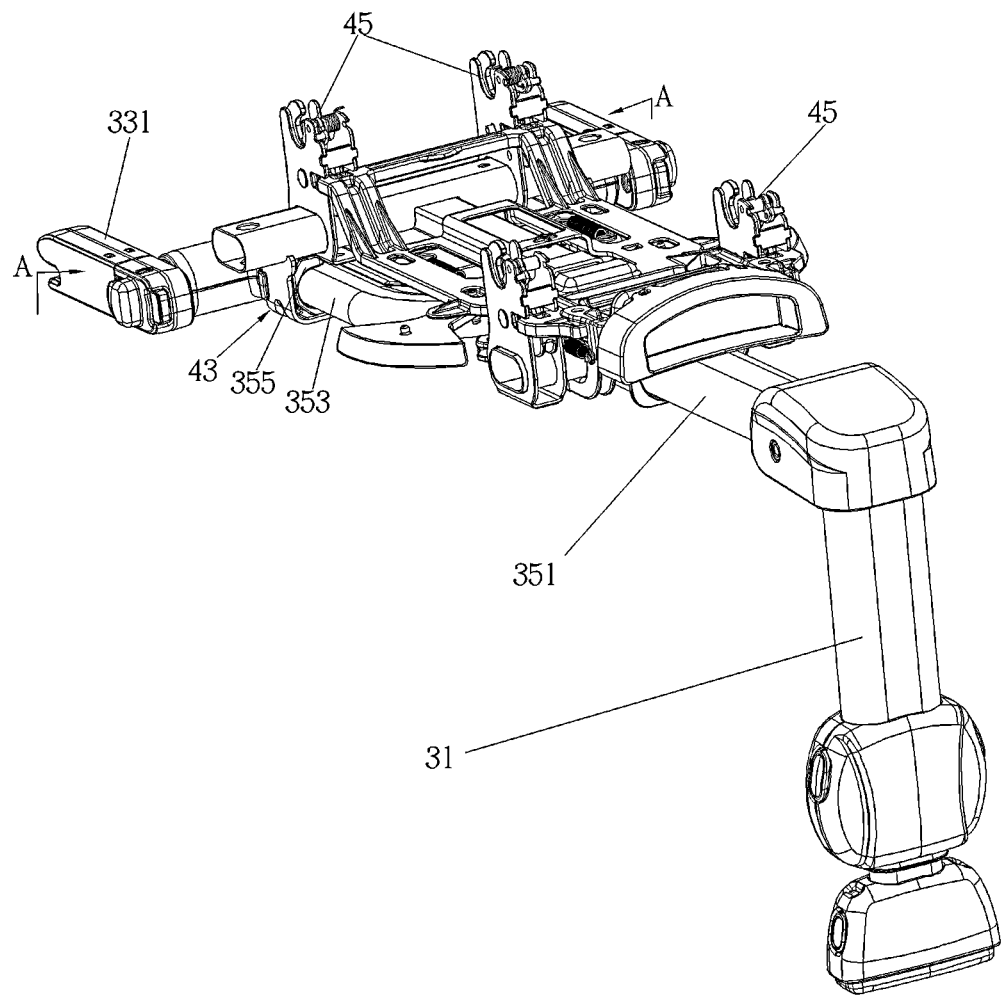
FIG. 5 is a schematic view illustrating a base shown in FIG. 2 being hidden.
Figure 6:
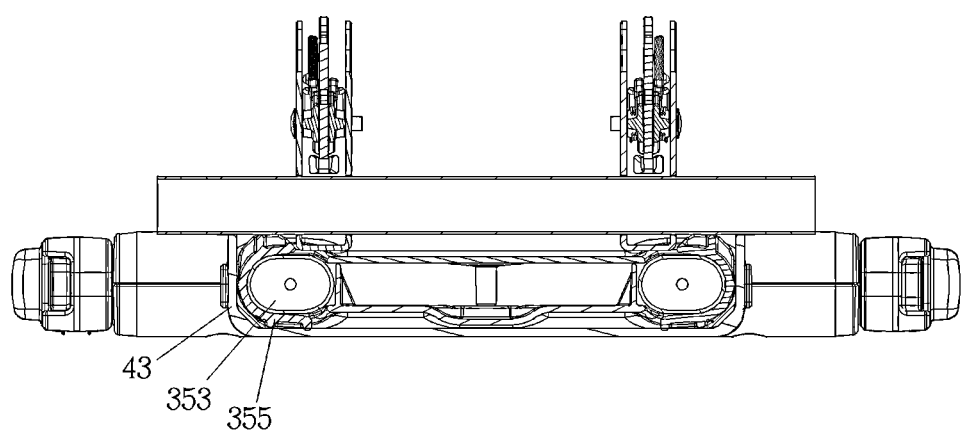
FIG. 6 is a cross-sectional view of FIG. 5 along line A-A.
Figure 7:
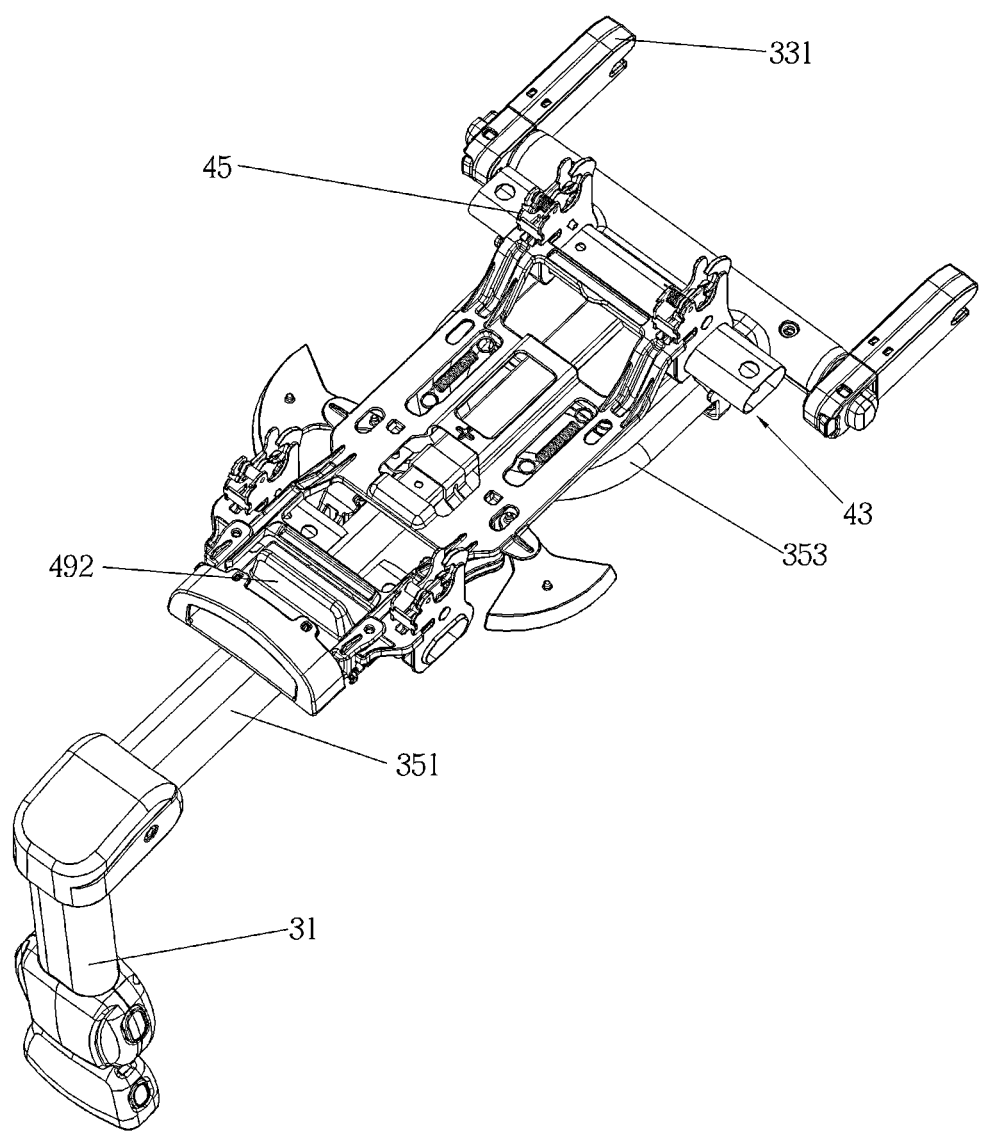
FIG. 7 is a schematic illustrating a base shown in FIG. 2 being hidden from another viewing angle.
Figure 8:
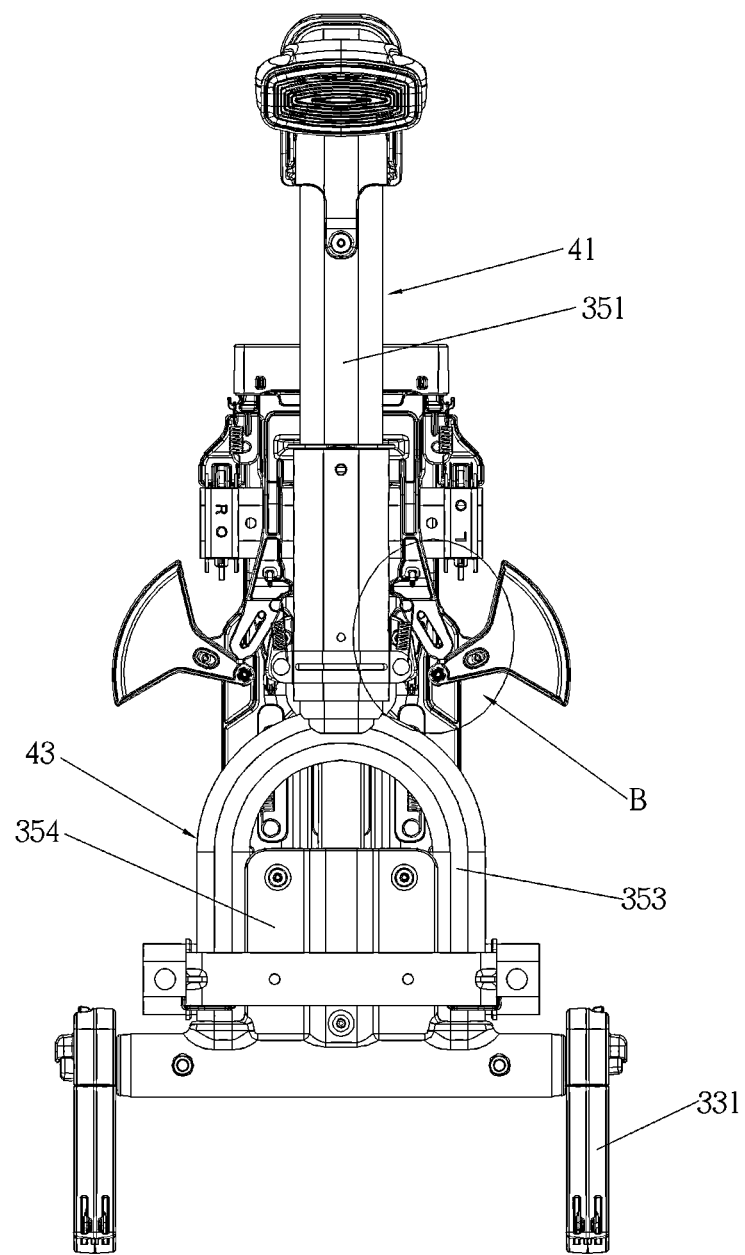
FIG. 8 is a top view of FIG. 7.
Figure 11:
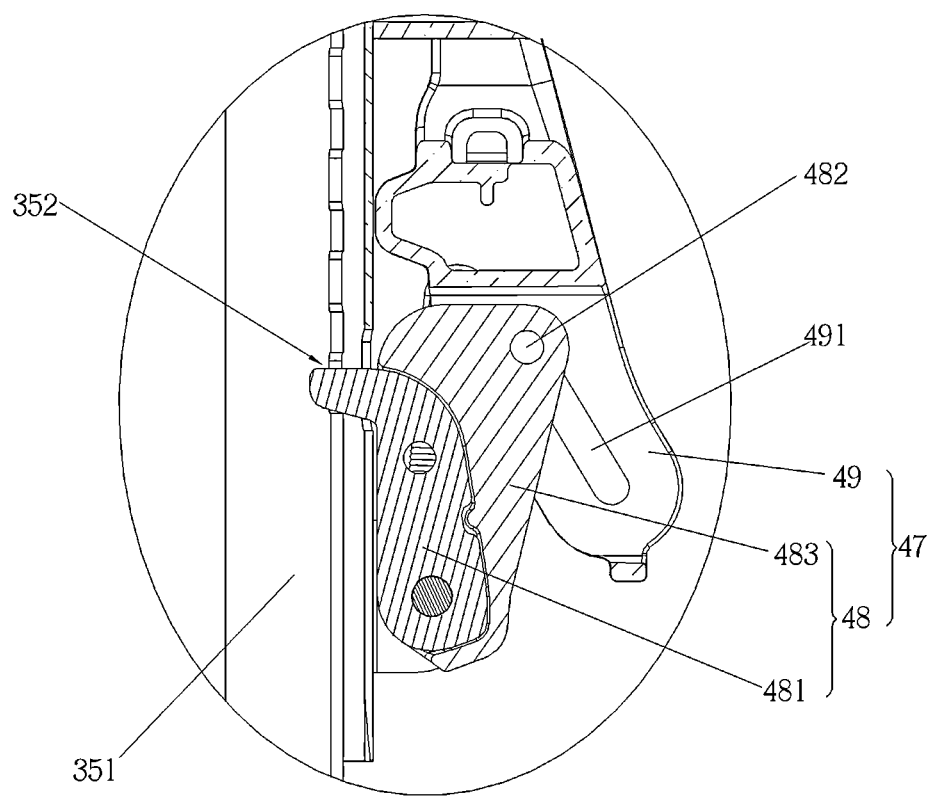
FIG. 11 is an enlarged view illustrating a region C shown in FIG. 10.

As shown in FIGS. 4 to 6, a first engaging portion 45 is disposed on the frame assembly 40 and configured to connect the base 20. As shown in FIG. 11, an operating mechanism 47 is disposed on the frame assembly 40 and configured to control the engagement of the ISOFIX assembly 30. Specifically, in this embodiment, four first engaging portions 45 are disposed at four corners of the frame assembly 40. The base 20 and the frame assembly 40 are stably connected to each other by the four first engaging portions 45. As shown in FIG. 11, the operating mechanism 47 includes an engaging device 48 and an operating member 49. The operating member 49 is controlled to operate the engaging device 48 to unlock the ISOFIX assembly 30. Specifically, the engaging device 48 includes an engaging hook 481 for engaging with the ISOFIX assembly 30. The operating member 49 is connected to the engaging device 48. The operating member 49 is operable to drive the engaging hook 481 to unlock the ISOFIX assembly 30. Furthermore, the first sliding rail portion 351 has at least one engaging hole 352 engaged with the engaging hook 481. Lock and unlock functions of an embodiment of the invention can be achieved by the engaging hook 481 and the engaging hole 352. In at least one embodiment, a plurality of engaging holes 352 may be disposed on the first sliding rail portion 351 separately. More particularly, the engaging holes 352 may be arranged on the first sliding rail portion 351 along a straight line and separated from each other with an identical gap, such that the ISOFIX assembly 30 can be adjusted telescopically and conveniently with respect to the base 20.

Still further, as shown in FIGS. 7 to 11, the engaging device 48 further includes a fixing bracket 483 and the engaging hook 481 is connected to the operating member 49 through the fixing bracket 483. Specifically, in this embodiment, the fixing bracket 483 is connected to the engaging hook 481 and an end of the fixing bracket 483 is connected to the operating member 49, such that the operating member 49 can be driven to drive the engaging hook 481 to move. Moreover, the operating member 49 has a driving groove 491, the fixing bracket 483 has a fixing pillar 482 extending into the driving groove 491, and the operating member 49 is operable to enable the driving groove 491 to drive the fixing pillar 482 to move, such that the engaging hook 481 is disengaged from the engaging hole 352.

Figure 2:
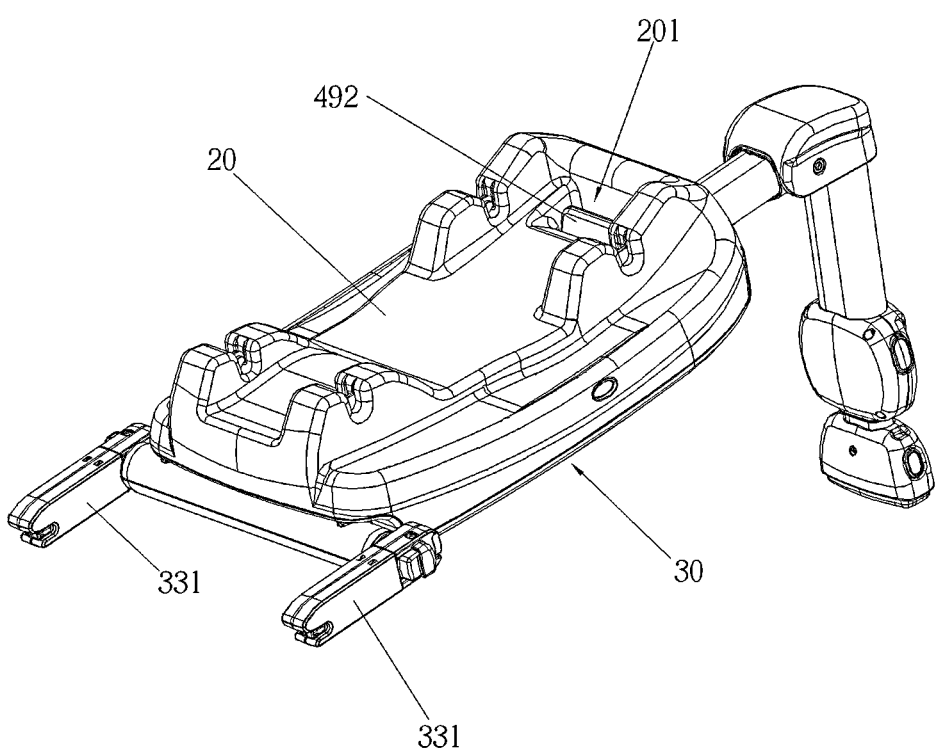
FIG. 2 is a schematic view illustrating the child safety seat shown in FIG. 1 without a seat body.

As shown in FIGS. 7 to 11, in order to perform operation conveniently, the operating member 49 of this embodiment has a button 492 and the button 492 is operable to enable the operating member 49 to drive the engaging hook 481 to be disengaged from the engaging hole 352. In at least one embodiment, the base 20 may have a through hole 201 (as shown in FIG. 2). The button 492 passes through the through hole 201 and protrudes from the base 20. Accordingly, the button 492 can be operated conveniently to drive the engaging hook 481 to be disengaged from the engaging hole 352.

Figure 9:
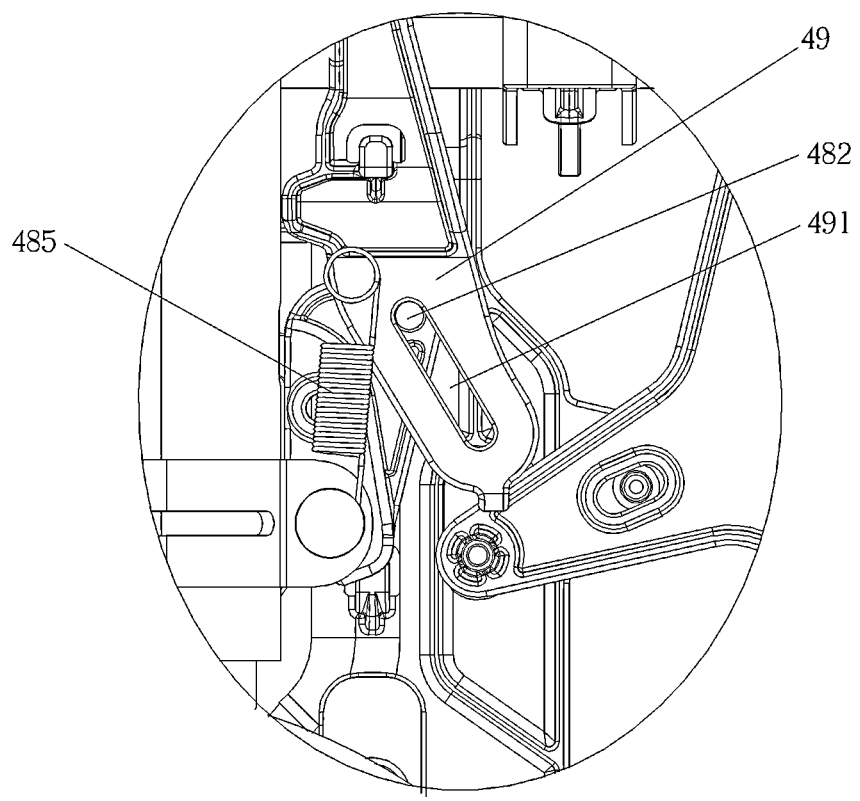
FIG. 9 is an enlarged view illustrating a region B shown in FIG. 8.
Figure 10:
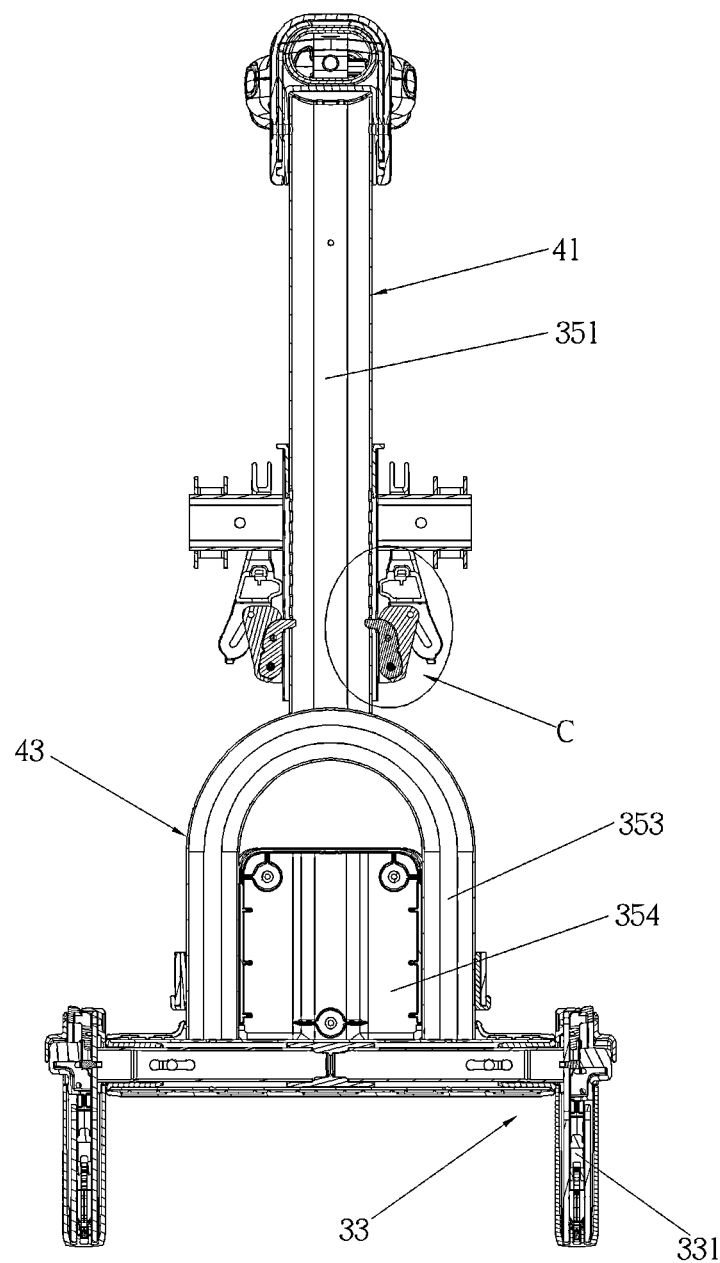
FIG. 10 is a cross-sectional view illustrating a connecting relationship between an engaging hook, a fixing bracket and an operating member.

Furthermore, the engaging device 48 further includes an elastic member 485 (as shown in FIG. 9). The elastic member 485 drives the operating member 49 to return, such that the engaging hook 481 engages with the engaging hole 352. In this embodiment, the elastic member 485 is a spring. An end of the spring is fixed on the operating member 49 and another end of the spring is fixed on the frame assembly 40.

Figure 3:
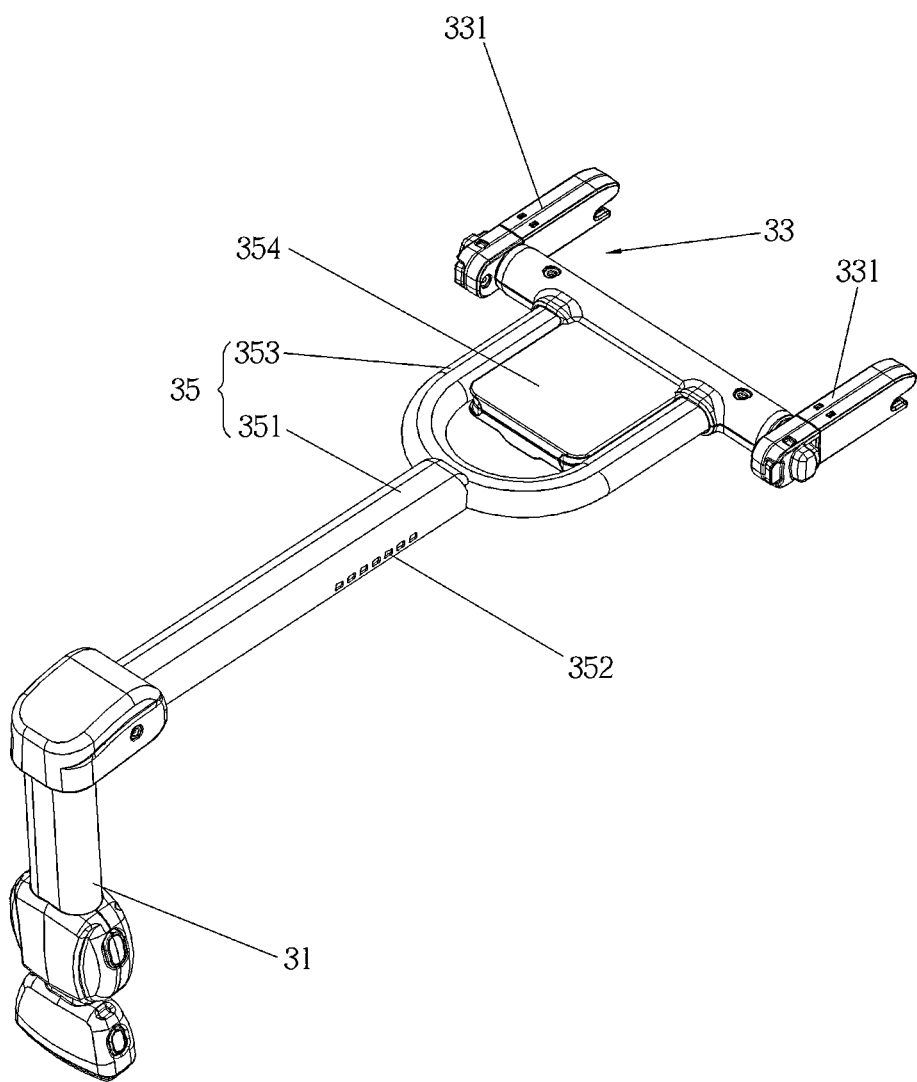
FIG. 3 is a schematic view illustrating an ISOFIX assembly of an embodiment of the invention.

As shown in FIG. 3, the sliding rail portion 35 of the ISOFIX assembly 30 of the invention is Y-shaped. Specifically, in this embodiment, the first sliding rail portion 351 is a straight tube and the second sliding rail portion 353 is a U-shaped tube. An opening end of the U-shaped tube is connected to the connecting portion 33 and a side of the U-shaped tube opposite to the opening end is connected to the straight tube. The first sliding rail portion 351 is slidably inserted into the first sleeve portion 41 and the second sliding rail portion 353 is slidably inserted into the second sleeve portion 43. The engaging holes 352 for engaging with the engaging hook 481 are disposed on the straight tube, such that it is beneficial for the ISOFIX assembly 30 to telescopically slide with respect to the base 20 to perform engagement and disengagement. The U-shaped tube is connected to the straight tube. In this embodiment, the U-shaped tube is connected to the straight tube by welding, but the invention is not so limited. In addition, in order to improve the support strength of the U-shaped tube, a decorative cover member 354 may be disposed within the U-shaped tube and the decorative cover member 354 is connected to the U-shaped tube. The decorative cover member 354 disposed within the U-shaped tube may provide more connecting positions without damaging the U-shaped tube, so as to reduce the number of installation holes on the U-shaped tube to improve its fatigue strength. The connecting portion 33 has two connecting rods 331 and the two connecting rods 331 are configured to connect an anchor port on the car seat. In at least one embodiment, the connecting rod 331 may be rotatably disposed on the connecting portion 33, such that the connecting rod 331 can be folded conveniently when not in use, so as to avoid occupying space.

As shown in FIGS. 5 and 6, a sliding sleeve 355 is disposed between the second sliding rail portion 353 and the second sleeve portion 43. Specifically, in this embodiment, a sliding sleeve 355 is disposed between the U-shaped tube and the second sleeve portion 43. The U-shaped tube can be precisely and slidably inserted into the second sleeve portion 43 by the sliding sleeve 355 and the sliding sleeve 355 can reduce friction between the U-shaped tube and the second sleeve portion 43, so as to increase its service life.

The operation of the child safety seat 100 of an embodiment of the invention will be described with reference to FIGS. 1 to 11.

The base 20 and the frame assembly 40 are fixed and engaged with each other by the first engaging portions 45 of the frame assembly 40. The first sliding rail portion 351 of the ISOFIX assembly 30 is slidably inserted into the first sleeve portion 41 and the second sliding rail portion 353 of the ISOFIX assembly 30 is slidably inserted into the second sleeve portion 43. At the same time, the engaging hook 481 engages with the engaging hole 352. The frame assembly 40 engages with the ISOFIX assembly 30 by the first sleeve portion 41, the second sleeve portion 43 and the engaging hook 481, so as to ensure the stability of the ISOFIX assembly 30 and the frame assembly 40. Accordingly, an embodiment of the invention can ensure that the connection between the child safety seat 100 and the ISOFIX assembly 30 will not shake.

When the ISOFIX assembly 30 needs to be adjusted telescopically with respect to the base 20, the user drives the button 492 to enable the driving groove 491 of the operating member 49 to drive the fixing pillar 482 of the fixing bracket 483 to move, such that the fixing bracket 483 drives the engaging hook 481 to be disengaged from the engaging hole 352. At this time, the ISOFIX assembly 30 and the frame assembly 40 are unlocked. Then, the base 20 can be moved forward and backward to perform adjustment on the ISOFIX assembly 30. When the base 20 is adjusted to the desired position, the button 492 is released. The elastic member 485 provides an elastic force to drive the operating member 49 to return to the initial position, so as to drive the engaging hook 481 to be engaged with the engaging hole 352. Accordingly, the ISOFIX assembly 30 can be adjusted telescopically with respect to the base 20 and the whole operation is convenient. Since the first sliding rail portion 351 and the second sliding rail portion 353 provide three point support for the frame assembly 40, the ISOFIX assembly 30 and the base 20 will not shake while the ISOFIX assembly 30 telescopically slides with respect to the base 20.

Compared to the prior art, the ISOFIX assembly 30 of the child safety seat 100 of an embodiment of the invention includes the first sliding rail portion 351 and the second sliding rail portion 353, and the width of the second sliding rail portion 353 is larger than the width of the first sliding rail portion 351, such that the sliding rail portion 35 provides three point support for the frame assembly 40. When the first sliding rail portion 351 is slidably inserted into the first sleeve portion 41 and the second sliding rail portion 353 is slidably inserted into the second sleeve portion 43, the ISOFIX assembly 30 provides three point support for the frame assembly 40, so as to enhance the stability between the ISOFIX assembly 30 and the frame assembly 40 and reduce shaking of the ISOFIX assembly 30 on the frame assembly 40. More particularly, when the base 20 is operated to slide on the ISOFIX assembly 30, the ISOFIX assembly 30 can be adjusted telescopically with respect to the base 20, the stability of sliding can be ensured, the shaking between the ISOFIX assembly 30 and the base 20 can be reduced, and the comfort and safety of a child seated in the child safety seat 100 can be improved simultaneously. Furthermore, since the ISOFIX assembly 30 can be adjusted telescopically with respect to the base 20, the child safety seat 100 can be adjusted to a comfortable position required by a child seated therein and satisfies the riding requirements of children with different ages.

The foregoing are only embodiments of the invention while the protection scope thereof is not limited to the above description. Any change or substitution within the technical scope disclosed by the invention should be covered by the protection scope of the invention.

The invention claimed is:

1. A child safety seat wherein the child safety seat comprises:
   an ISOFIX assembly comprising a support foot, a connecting portion, and a sliding rail portion disposed between the support foot and the connecting portion, the connecting portion being configured to connect a car seat, the sliding rail portion comprising a first sliding rail portion and a second sliding rail portion connected to the first sliding rail portion, a width of the second sliding rail portion being larger than a width of the first sliding rail portion; and
   a base having a frame assembly, the frame assembly having a sleeve portion slidably sleeved on the sliding rail portion, the sleeve portion comprising a first sleeve portion slidably sleeved on the first sliding rail portion and a second sleeve portion slidably sleeved on the second sliding rail portion, the base being operable to be adjusted telescopically with respect to the ISOFIX assembly through a sliding cooperation between the sliding rail portion and the sleeve portion.

2. The child safety seat of claim 1 further wherein the base further has an operating mechanism and the operating mechanism is operable to control the sliding cooperation between the sliding rail portion and the sleeve portion.

3. The child safety seat of claim 2 further wherein the operating mechanism is disposed on the frame assembly, the operating mechanism comprises an engaging device, and the engaging device comprises an engaging hook for engaging with the ISOFIX assembly.

4. The child safety seat of claim 3 further wherein the operating mechanism further comprises an operating member connected to the engaging device and the operating member is operable to drive the engaging hook to unlock the ISOFIX assembly.

5. The child safety seat of claim 4 further wherein the engaging device further comprises a fixing bracket and the engaging hook is connected to the operating member through the fixing bracket.

6. The child safety seat of claim 5 further wherein the operating member has a driving groove, the fixing bracket has a fixing pillar extending into the driving groove, and the operating member is operable to enable the driving groove to drive the fixing pillar to move, such that the engaging hook unlocks the ISOFIX assembly.

7. The child safety seat of claim 4 further wherein the engaging device further comprises an elastic member and the elastic member drives the operating member to return, such that the engaging hook engages with the ISOFIX assembly.

8. The child safety seat of claim 4 further wherein the operating member has a button and the button is operable to enable the operating member to drive the engaging hook to unlock the ISOFIX assembly.

9. The child safety seat of claim 8 further wherein the base has a through hole and the button passes through the through hole.

10. The child safety seat of claim 3 further wherein the first sliding rail portion has at least one engaging hole engaged with the engaging hook.

11. The child safety seat of claim 1 further wherein the sliding rail portion of the ISOFIX assembly is Y-shaped.

12. The child safety seat of claim 1 further wherein the first sliding rail portion is a straight tube, the second sliding rail portion is a U-shaped tube, an opening end of the U-shaped tube is connected to the connecting portion, and a side of the U-shaped tube opposite to the opening end is connected to the straight tube.

13. The child safety seat of claim 12 further wherein the U-shaped tube is connected to the straight tube.

14. The child safety seat of claim 12 further comprising a decorative cover member is disposed within the U-shaped tube and the decorative cover member is connected to the U-shaped tube.

15. The child safety seat of claim 1 further wherein the connecting portion has two connecting rods and the two connecting rods are configured to connect an anchor port on a car seat.

16. The child safety seat of claim 1 further comprising a sliding sleeve disposed between the second sliding rail portion and the second sleeve portion.

* * * * *